(12) United States Patent
Gleaton et al.

(10) Patent No.: US 9,010,600 B1
(45) Date of Patent: Apr. 21, 2015

(54) HOLSTER VEHICLE MOUNT

(75) Inventors: George Bert Gleaton, McDonough, GA (US); Jimmy Fred Smallwood, Oxford, GA (US); David Glenn Wasson, Oxford, GA (US)

(73) Assignee: Gum Creek Customs, LLC, Oxford, GA (US)

(*) Notice: Subject to any disclaimer, the term of this patent is extended or adjusted under 35 U.S.C. 154(b) by 0 days.

(21) Appl. No.: 12/897,748

(22) Filed: Oct. 4, 2010

Related U.S. Application Data (60) Provisional application No. 61/248,376, filed on Oct. 2, 2009.

(51) Int. Cl.
   *B60R 7/06* (2006.01)
   *F41C 33/04* (2006.01)

(52) U.S. Cl.
   CPC *B60R 7/06* (2013.01); *F41C 33/046* (2013.01)

(58) Field of Classification Search
   CPC ............ B60R 7/06; B60R 7/14; F41C 33/046
   USPC ......... 224/276, 572, 483, 539, 540, 543, 547, 224/550, 556, 560, 561
   See application file for complete search history.

(56) References Cited

U.S. PATENT DOCUMENTS

| | | | | |
|---|---|---|---|---|
| 1,978,216 A | * | 10/1934 | Miller | 211/31 |
| 2,037,132 A | * | 4/1936 | Hoyt | 224/623 |
| 3,014,759 A | * | 12/1961 | Bing | 297/188.06 |
| 4,984,725 A | * | 1/1991 | Urbom | 224/311 |
| 4,995,537 A | * | 2/1991 | Thedieck | 224/547 |
| 5,495,969 A | * | 3/1996 | Cardenas | 224/275 |
| 5,865,502 A | * | 2/1999 | Ayers et al. | 297/188.06 |
| 6,405,909 B1 | * | 6/2002 | Burnett et al. | 224/275 |
| 6,648,193 B2 | * | 11/2003 | Rioux | 224/276 |
| 2006/0213942 A1 | * | 9/2006 | Gomez et al. | 224/532 |
| 2008/0047992 A1 | * | 2/2008 | Fabian | 224/275 |
| 2009/0283562 A1 | * | 11/2009 | Podschus | 224/572 |
| 2010/0176167 A1 | * | 7/2010 | Hudspeth | |

* cited by examiner

*Primary Examiner* — Brian D Nash
*Assistant Examiner* — Corey Skurdal
(74) *Attorney, Agent, or Firm* — Michael J. Bootcheck, LLC (57) ABSTRACT

A holster vehicle mount for mounting and securing a holster (such as that used with handguns or other devices) between a steering column and a lower dash panel.

18 Claims, 11 Drawing Sheets

HOLSTER VEHICLE MOUNT

CROSS-REFERENCE TO RELATED APPLICATIONS

This application claims priority from U.S. Provisional Application Ser. No. 61/248,376 filed Oct. 2, 2009, which is titled "Universal Handgun Holster Mount That Attaches Under a Steering Wheel Column in Vehicles" which is hereby incorporated by reference.

FIELD OF THE INVENTION

This invention relates to a removable holster vehicle mount. More particularly, the invention relates to a universal mounting system in which a wide variety of holsters may be securely and easily mounted in a virtually infinite number of installation locations/vehicles.

BACKGROUND OF THE INVENTION

Storage and transportation of firearms is a problem for anyone that must do it on a regular basis. Many individuals find that they would like to have access to their firearm, particularly when in a vehicle, but there are only a few options of where to store the firearm. The individual may store the firearm in the glove compartment, but such location is not very convenient if the person wants to retrieve the firearm quickly, i.e., it is not within easy reach. Other locations include laying the firearm on/under or around the seating areas. Such locations are also in adequate as the firearm is either easily dislodged in the case of quick acceleration/deceleration (i.e., accidents), or it is not within easy reach of the individual. Thus, there is a need for a vehicle mount that will permit a person to safely and securely mount their weapon, while also keeping it within a convenient reach. Such a device may be particularly useful by those in law enforcement.

SUMMARY OF THE INVENTION

According to one exemplary embodiment of the present invention, the device comprises, an adjustable tension strap having a first surface, second surface, thickness T, first end and distal end, a first attachment means attached at the first end of the adjustable tension strap, a second attachment means attached to the distal end of the adjustable tension strap, and means of attaching a holster to the adjustable tension strap, wherein a length between the first end of the adjustable tension strap and the distal end of the first adjustable tension strap may be adjusted

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Figure 1:
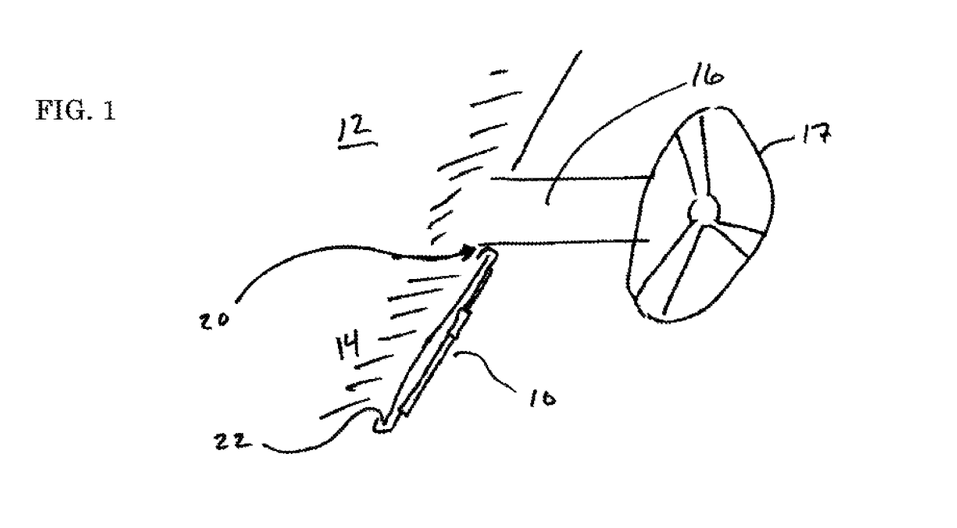
FIG. 1 illustrates a side view of an exemplary embodiment of the present invention.
Figure 2:
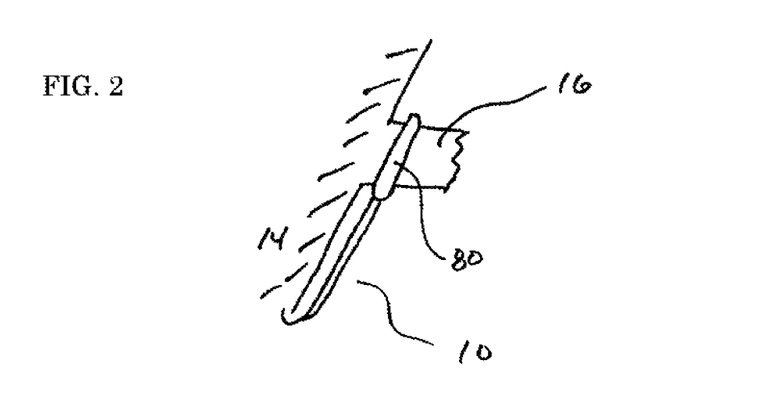
FIG. 2 illustrates a side view of an exemplary embodiment of the present invention.
Figure 3:
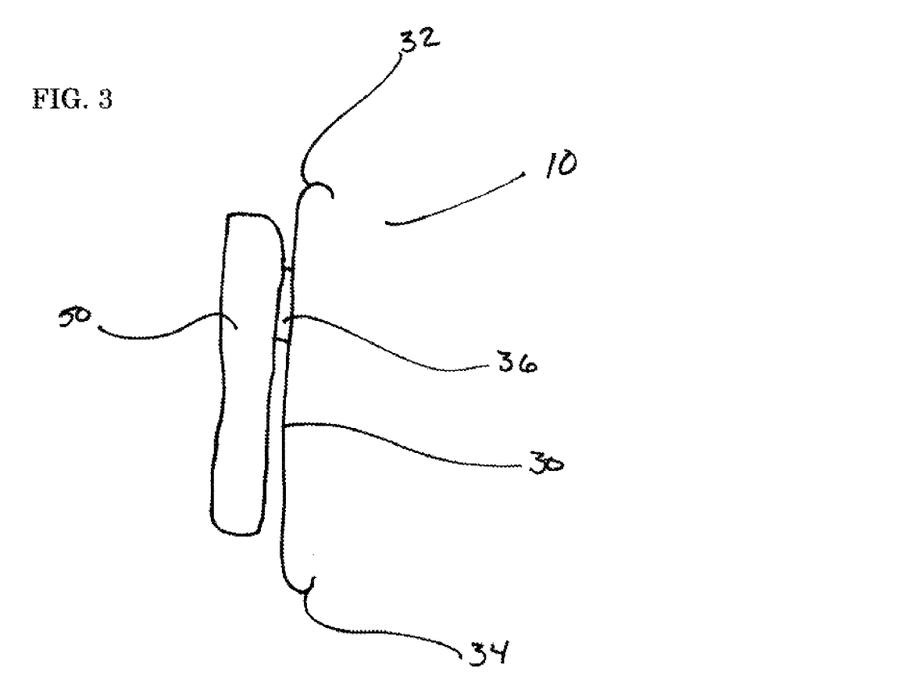
FIG. 3 illustrates a side view of an exemplary embodiment of the present invention.
Figure 4:
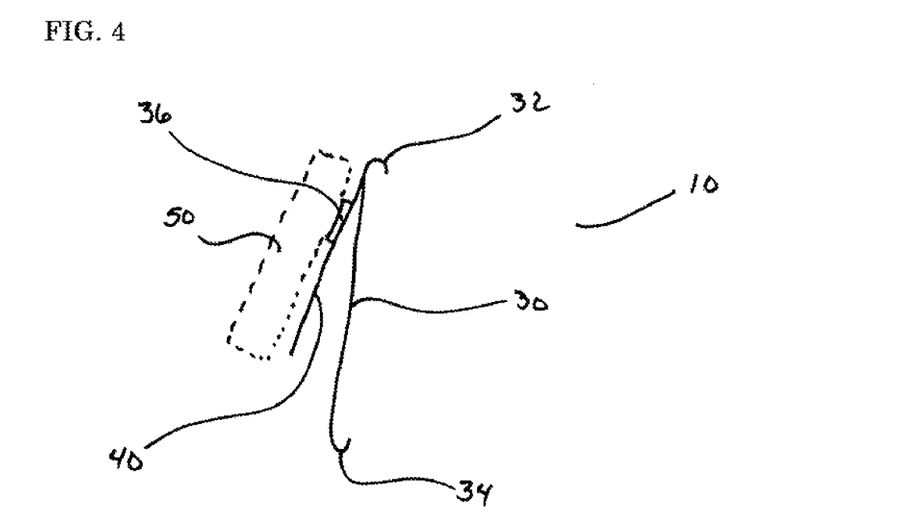
FIG. 4 illustrates a side view of an exemplary embodiment of the present invention.
Figure 6A:
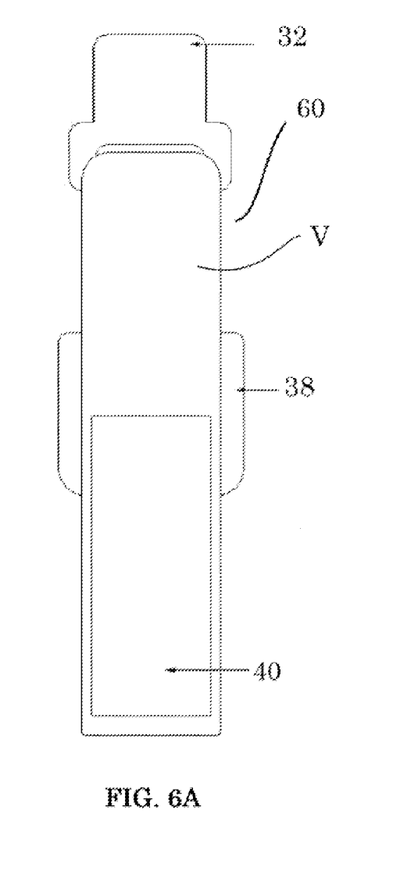
FIGS. 6A-6C illustrate front, side and rear views, respectively, of an exemplary embodiment of the present invention.
Figure 6B:
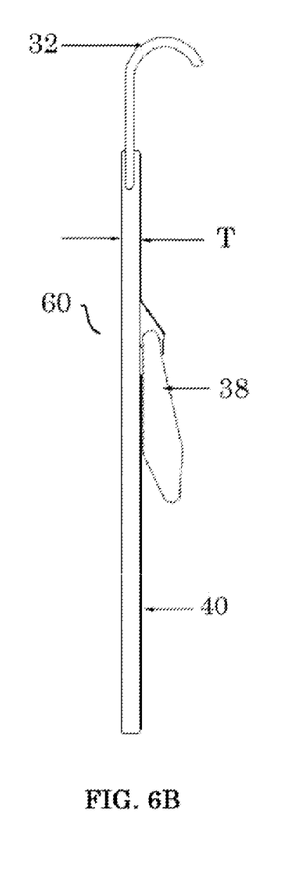
Figure 6C:
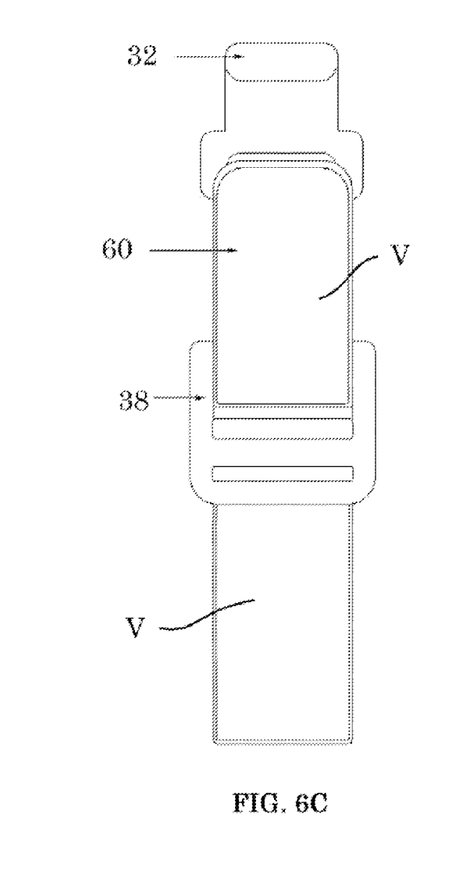
Figure 7A:
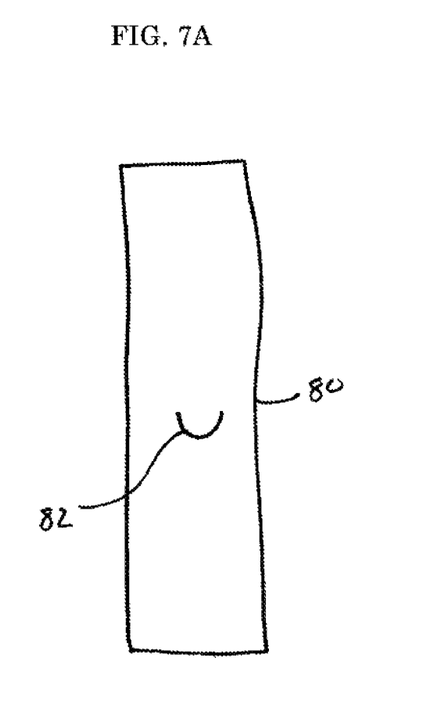
FIGS. 7A-7B illustrate various exemplary embodiment steering column straps.
Figure 7B:
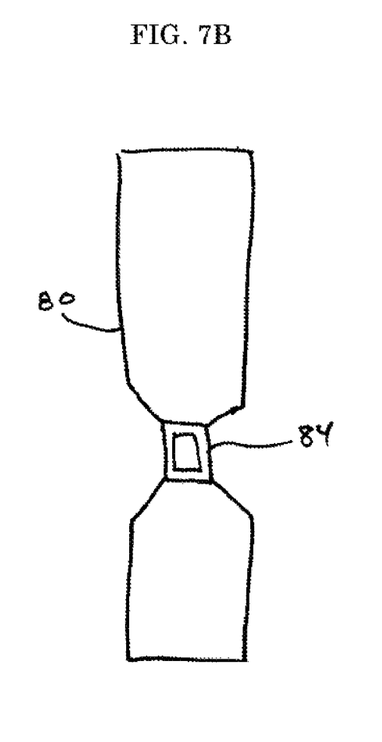

FIG. 1 illustrates a side view of an exemplary embodiment of the present invention. FIG. 2 illustrates a side view of an exemplary embodiment of the present invention. FIG. 3 illustrates a side view of an exemplary embodiment of the present invention. FIG. 4 illustrates a side view of an exemplary embodiment of the present invention. FIGS. 5A-5J illustrate various views and exemplary components of an exemplary embodiment of the present invention. FIGS. 6A-6C illustrate front, side and rear views, respectively, of an exemplary embodiment of the present invention. FIGS. 7A-7B illustrate various exemplary embodiment steering column straps. FIGS. 8A-8H illustrate an exemplary installation process of an exemplary embodiment holster vehicle mount onto a vehicle.

FIG. 1 illustrates an exemplary embodiment holster vehicle mount 10 in place in a dashboard/kickplate area of a vehicle. In the illustrated embodiment, holster vehicle mount 10 is positioned below vehicle 12's steering column/steering wheel column 16, and is held in place along vehicle dash 14. Also shown is steering wheel 17. In this embodiment, vehicle 12 has a steering column gap/upper gap/upper edge/upper mount 20 and a lower gap/lower edge/lower mount 22. Holster vehicle mount 10 is anchored and held in place via mounting means between the upper gap and lower gap as discussed further below.

FIG. 2 illustrates another exemplary embodiment holster vehicle mount 10 in place in a vehicle. In this exemplary vehicle installation there is either no gap, too small of a gap, or the user elected to install holster vehicle mount 10 in an installation in which instead of utilizing an upper gap, a strap or other device, such as steering column strap 80, is affixed to steering column 16 such that the upper portion of holster vehicle mount 10 is affixed to the strap, or a component thereof.

FIG. 3 illustrates a side view of an exemplary embodiment holster vehicle mount 10. Illustrated is holster vehicle mount 10, adjustable tension strap 30, first attachment means 32, second attachment means 34, holster strap 36 (allows holster to be connected to holster vehicle mount 10). Such an embodiment may have an elastic, or otherwise adjustable tension strap 30. In this embodiment, adjustable tension strap 30 may be comprised of an material that is elastic or otherwise extendable/retractable such that the strap is capable of being in at least two conditions, loose where it can be placed, and a tightened position such that holster vehicle mount 10 is securely held in place. Such strap may be comprised of one or more elastic portions that allow the adjustable tension strap to maintain such positions/conditions.

The illustrated adjustable tension strap having a first surface, second surface, thickness T, first end and distal end.

FIG. 4 illustrates a side view of another exemplary embodiment holster vehicle mount 10. Illustrated is holster vehicle mount 10, adjustable tension strap 30, first attachment means 32, second attachment means 34, and holster mounting plate 40.

In this exemplary embodiment, holster mounting plate 40 may be separate or unitary with adjustable tension strap 30. In the illustrated embodiment, holster mounting plate 40 is a separate component, but is attached to tension strap 30. In some embodiments, holster mounting plate 40 may be rigid to provide a solid connection between a holster and the other components of holster vehicle mount 10. In some embodiments, holster mounting plate 40 may have some degree of flexibility and/or malleability, such as afforded by known aluminums, alloys, plastics, etc. such that the holster mounting plate, may be at least slightly deformed. Such ability to modify the shape of the holster mounting plate may allow a user to contour the holster mounting plate to their specific installation location, i.e., contour or bend the holster mounting plate to follow the contours of their dash panels. In other installations, a user may shape the holster mounting plate to align their mounted holster in a configuration/orientation to their liking, thus the adjustability of the holster mounting plate allows a user to customize the installation to suit their needs.

Figure 5A:
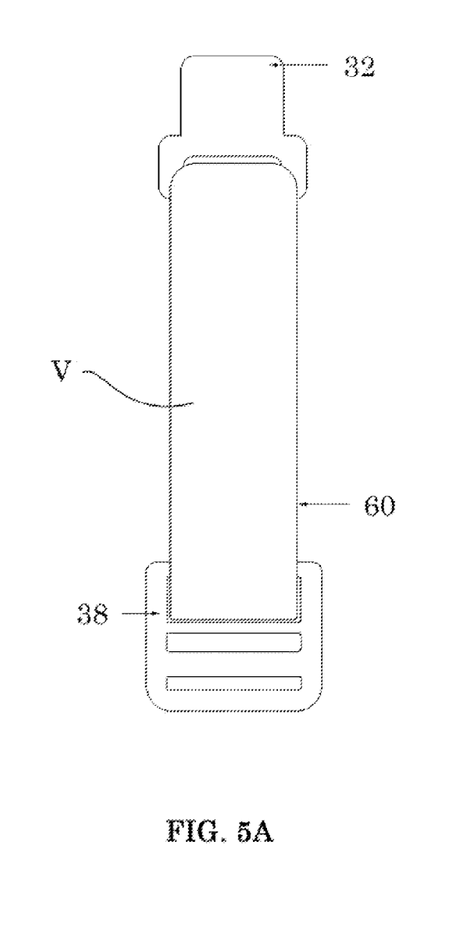
FIGS. 5A-5J illustrate various views and exemplary components of an exemplary embodiment of the present invention.
Figure 5B:
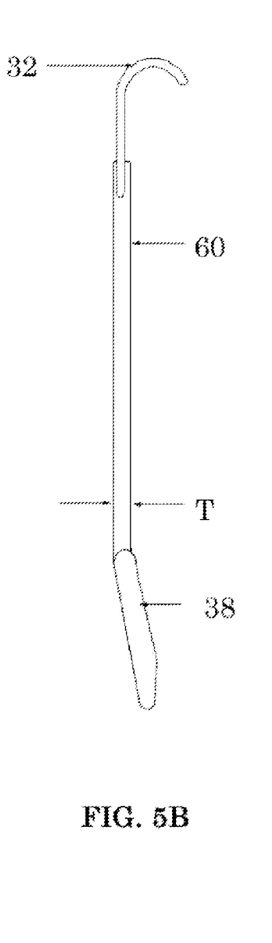
Figure 5C:
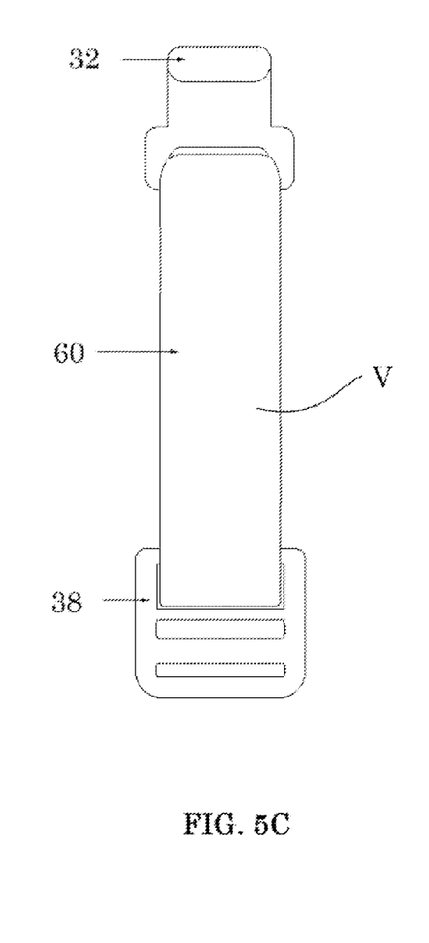
Figures 5D, 5E:
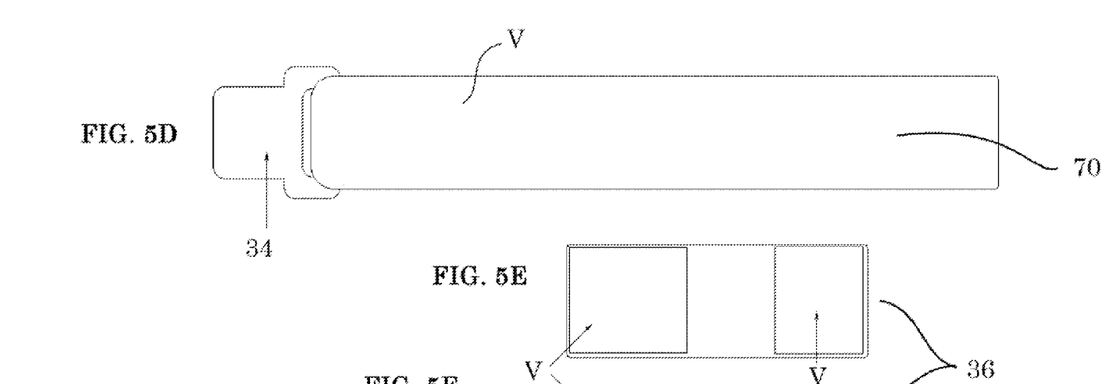
Figures 5F, 5G, 5H:
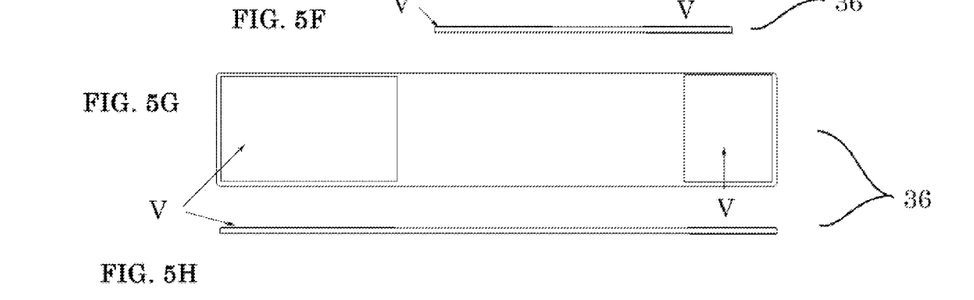
Figures 5I, 5J:
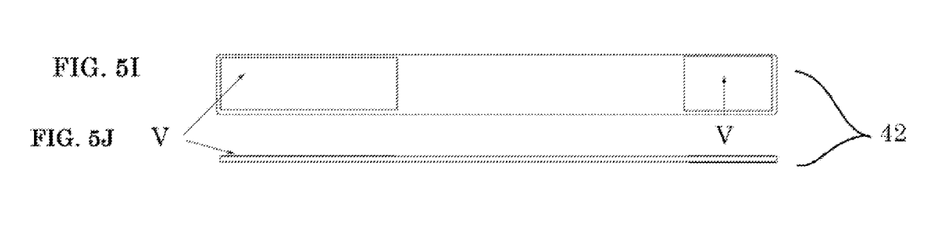

FIGS. 5A-5J illustrate various views of exemplary components of an exemplary embodiment of the present invention. In this embodiment of holster vehicle mount 10 adjustable tension strap 30 is comprised of a main strap/first strap/main holster strap/upper strap 60 (which is connected to first attachment means 32, as illustrated in FIG. 5A), second strap/lower strap 70 (which is connected to first attachment means 34, as illustrated in FIG. 5D), and a means connecting first and second straps 60, 70, including, but not limited to buckle 38 (as illustrated in FIG. 5A), snaps, hooks and loops (i.e., Velcro®), springs, clips, and clamps. Other illustrated components include: first attachment means 32, and second attachment means 34. FIGS. 5A-5C illustrate front, side and back views of main strap 60, FIG. 5D illustrates front view of second strap 70, FIGS. 5E and 5F, illustrates front and side views, respectively, of an exemplary holster strap 36, FIGS. 5G and 5H, illustrates a front and side views, respectively, of another exemplary holster strap 36, and FIGS. 5I and 5J, illustrates a front and side views, respectively, of an auxiliary strap/auxiliary holster strap 42.

The illustrated main strap 60 and second strap 70 each having a respective first surface, second surface, thickness T, first end and distal end.

Auxiliary strap/auxiliary holster strap 42 which may be used to provide additional stability in connecting holster 50 to holster vehicle mount 10. Any number, including zero, auxiliary straps may be utilized. Such straps may connect any of the various members of holster vehicle mount 10, or connect holster 50 to any of the various members of holster vehicle mount 10. The illustrated auxiliary 42 strap having a first surface, second surface, thickness T, first end and distal end.

Note that any of the surfaces of the various members may have connecting means on/attached to/incorporated with them or on their surface. Indicated in several of the views are locations V which may be suitable for application of hooks and loops connectors wherein the mating loop or hook as the matter may be, or other connection means, would be incorporated into the other component/surface to which connection is desired.

FIGS. 6A-6C illustrate front, side and rear views, respectively, of an exemplary embodiment of the present invention. In this exemplary embodiment, holster vehicle mount 10 may include adjustable tension strap 30, first attachment means 32, second attachment means 34, and holster mounting plate 40. Note that other components, such as those illustrated in FIGS. 5D-5J may be incorporated with this exemplary main strap 60/buckle 38. As discussed herein, holster mounting plate, if present, may be either a separate component attached to another component of the holster vehicle mount or incorporated into another component (i.e., it may be internal to main strap 60, for example).

FIGS. 7A-7B illustrate various exemplary embodiment steering column straps 80. FIG. 7A illustrates steering column strap 80 having a "D" ring 82 attached thereto. FIG. 7B illustrates steering column strap 80 having a ring 84 positioned in-line with the strap. These straps may be elastic, or secured about steering wheel column 16 by means known to those in the art including, but not limited to, buckles, snaps, hooks and loops, zippers, gluing, welding and bonding.

In another exemplary embodiment, there may be a single strap (though it may be comprised of separate members) such that the strap may be threaded through a gap in the dash and then the ends of the straps connected to each other, by such means including, but not limited to, buckles, snaps, hooks and loops, clips, and clamps. Such threaded straps may be comprised of multiple interconnected straps but the length of at least one of such members should be adjustable such that tension may be applied to the strap. In such embodiments, there may be no need for attachment means such as those in other embodiments.

Holsters which may be utilized with various embodiments of the present invention may be of varying design. Most commonly designed holsters currently available have either a belt loop or belt clip. Various exemplary embodiments of the present invention are compatible with virtually every holster currently available and it is expected that future holsters will also be compatible with several of the exemplary embodiments illustrated.

FIGS. 8A-8H illustrate an exemplary installation process of an exemplary embodiment holster vehicle mount onto a vehicle.

Figure 8A:
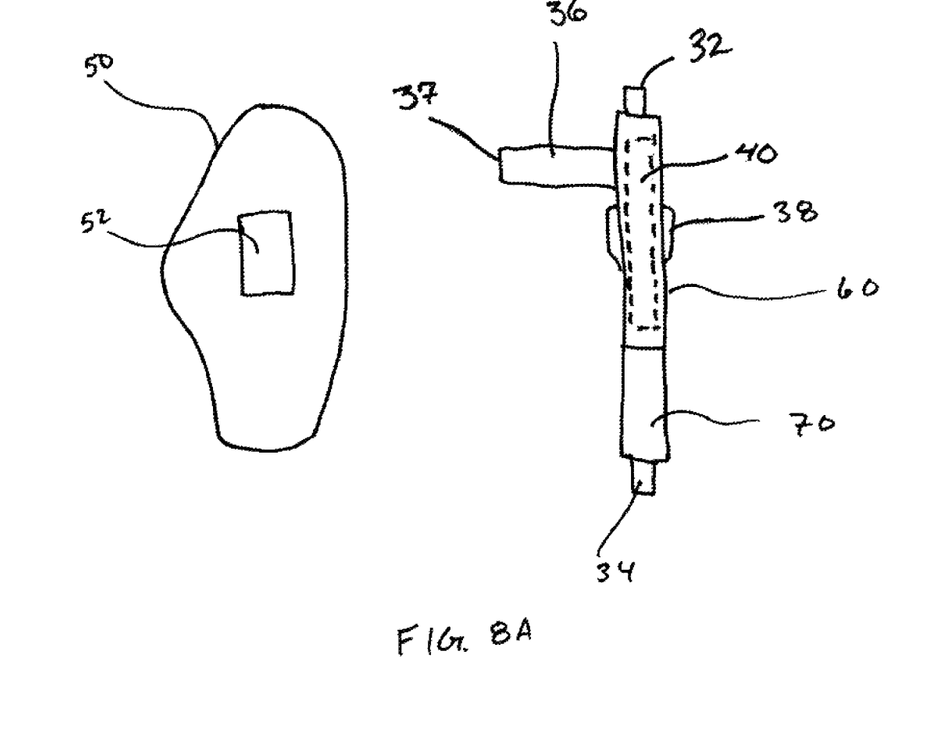
FIGS. 8A-8H illustrate an exemplary installation process of an exemplary embodiment holster vehicle mount onto a vehicle.

1. FIG. 8A illustrates a holster 50 that has either a belt loop or clip 52. If the holster is not ambidextrous, then you will need a left handed holster to face the butt end 54 of the gun 52 right, or a right handed holster to face the butt end of the gun left. Open both holster strap 36 and auxiliary strap 42 (in this embodiment, this accessory is being installed).

Figure 8B:
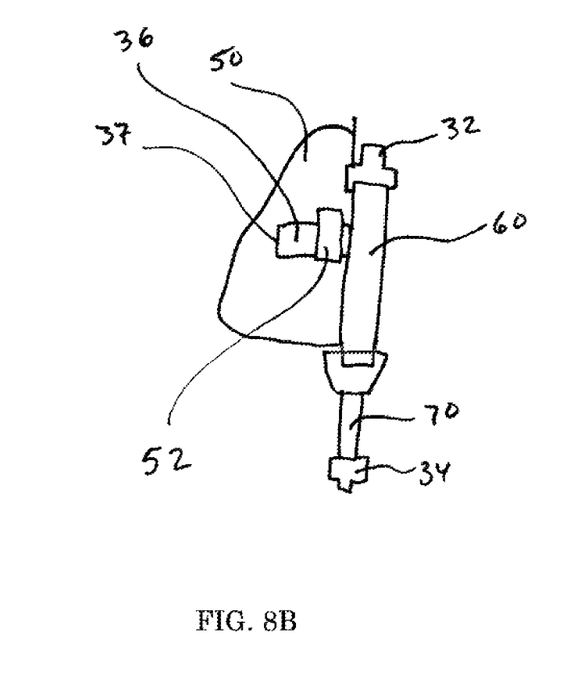

2. FIG. 8B Pull holster strap 36 through the inside of the belt loop or clip 52 of holster 50 as far as it will go. In this embodiment, holster strap 36 is at an upper portion of holster vehicle mount 10. Auxiliary strap 42 is at a lower portion of holster vehicle mount 10 and should not be used until the holster has been attached. Note that in this embodiment, holster strap 36 may be completely detached from the main part of the mount so that you can slightly adjust it vertically, horizontally, and angularly/cant. Such adjustability is not required in all embodiments and not all embodiments require that holster strap 36 be removable from other components of holster vehicle mount 10.

Figure 8C:
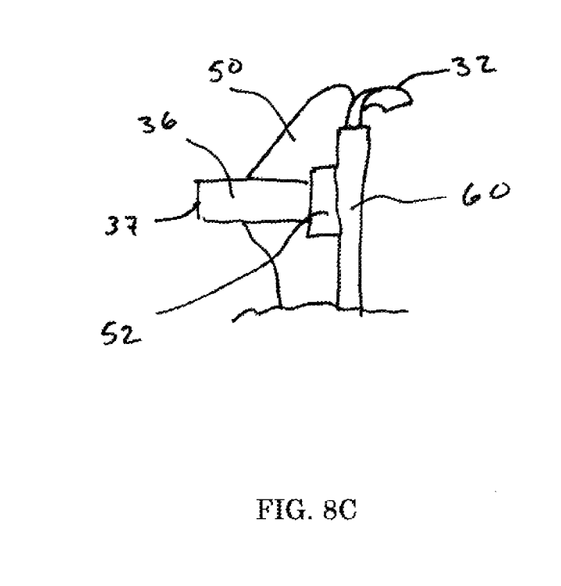

3. FIG. 8C Pull with tension and wrap holster strap 36, along with holster 50, around the front of main strap 60.

Figure 8D:
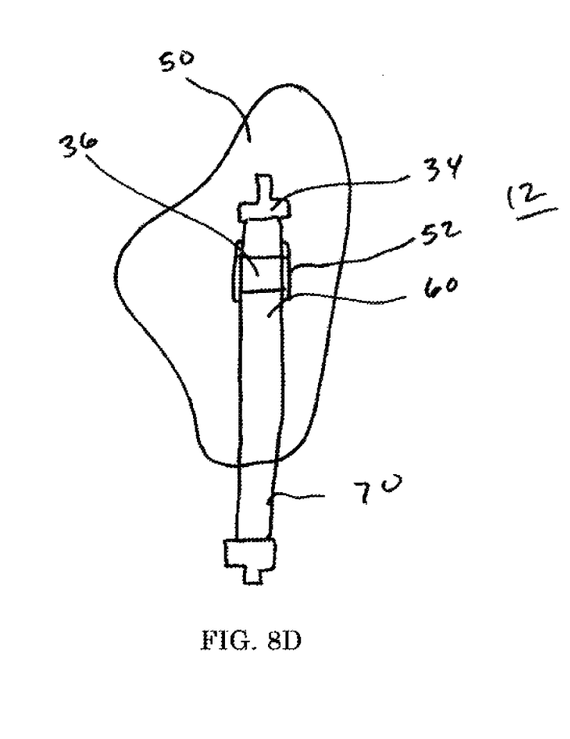

4. FIG. 8D Attach the free end of holster strap 36 to the main mounting strap (in this embodiment, it is on the back side of strap 60. Holster 50 should now be snug on holster strap 36.

Figure 8E:
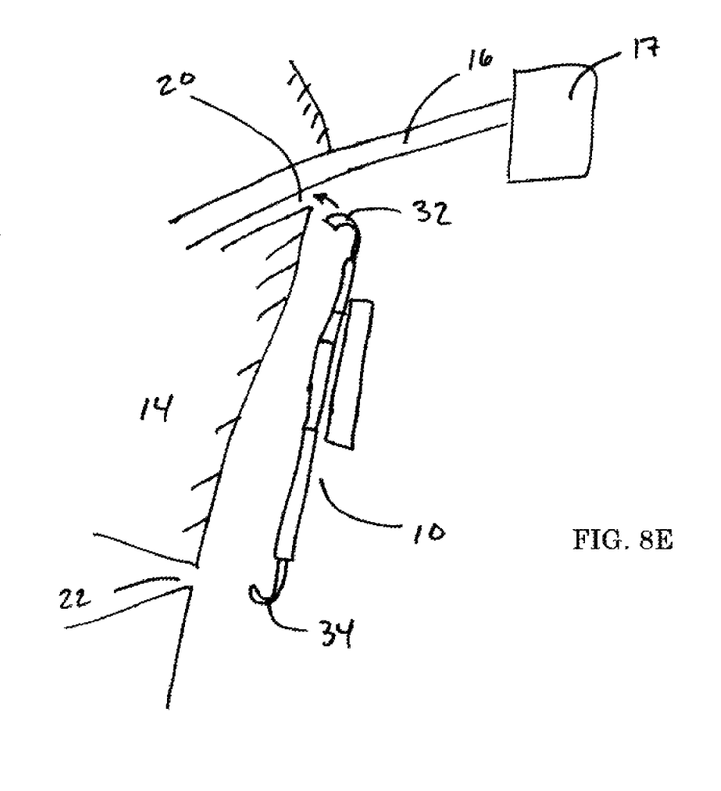

5. FIG. 8E Holster vehicle mount 10 is now ready to position in the vehicle. Place first attachment means 32 (that is now above and behind holster 52) into the desired gap in the vehicle. In this embodiment, the desired gap is steering column gap 20 below the steering wheel column of the vehicle.

Figure 8F:
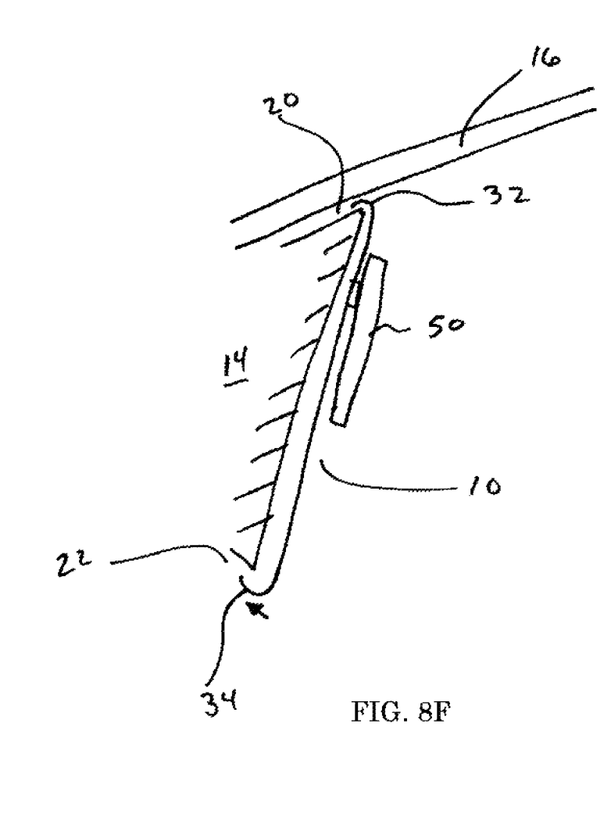

6. FIG. 8F Place lower attachment means 34 so that it fits onto a lower dash panel or somewhere in this area where it will allow tension to be applied between the attachment means so that holster vehicle mount 10 may be firmly mounted. In this illustration, gap 22 is located on a lower portion of the dash/vehicle/dashboard.

Figure 8G:
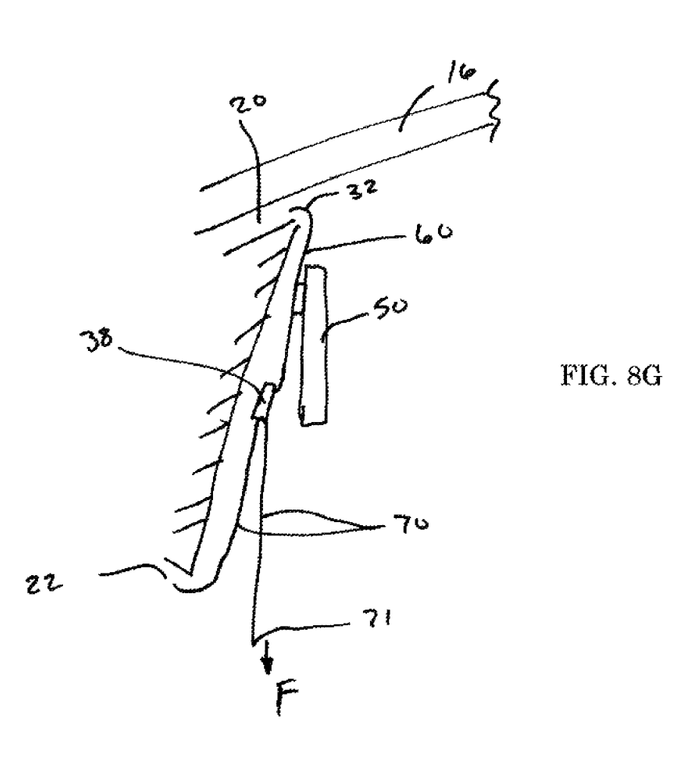

7. FIG. 8G Pull the strap down hard to tighten (such as indicated by "F" in the illustration), in this embodiment, force/tension is applied to free end 71 (i.e., the end not attached to the attachment means) of lower strap 70 to take up the extra slack. It may be beneficial to gently lift up on buckle 38 a little to allow the strap to slide for ease in taking up the slack. Continue to apply tension until holster vehicle mount 10 is secure and tight. Some embodiments may also include adhesive strips or foams which may be applied to various members of holster vehicle mount 10 to help reduce any undesired movements. Such adhesive strips may be attached, or incorporated with the attachment means, for example.

Figure 8H:
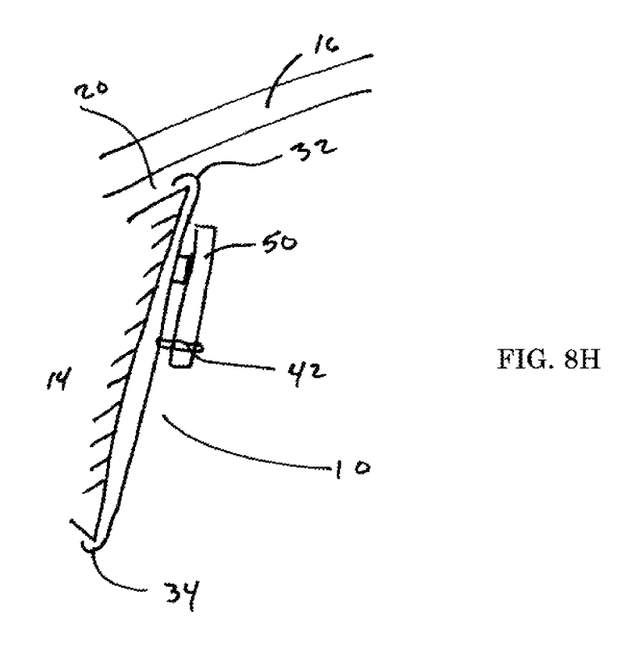

8. FIG. 8H Excess strap material may be stored behind the holster or dash, or removed. Some users may choose to leave the excess material as such additional slack may be necessary if a user subsequently decides to place holster vehicle mount 10 into another installation which has a different configuration.

A user may choose to attach optional auxiliary strap 42 to provide additional stability for holster 50. Such straps can be adjusted to suit the particular installation/holster/etc., by pulling it off and putting it back on.

Holster 50 is now mounted onto holster vehicle mount 10 and is ready to safely accept a firearm. Upon subsequent use of holster vehicle mount 10, it is advisable to regularly check that there is sufficient tension to prevent undesired movements of holster vehicle mount 10 as well as holster 50 (and the firearm, if present). To release the mount, a user may simply release the tension by adjusting the strap(s).

Of course many of these steps/processes may be preformed in an alternate order, and some steps/processes may be omitted entirely. In addition, if a steering column strap is utilized in the installation, then the steps/processes would involve attaching the first attachment means to either the steering column strap, or a component thereof.

Holster vehicle mounts of the present invention may be made of any suitable material including, but not limited to, nylon, polymers, plastic, wood, aluminum, metal, carbon fiber, ceramics, acrylics, acrylic glasses, glass and rubber.

Holster vehicle mounts of the present invention may be made of any suitable dimensions and thicknesses.

Although various components of the present invention may be illustrated as being of a particular shape for convenience, such components may be of any suitable shape, configuration, orientation, etc. Further, any number of additional components may be added to a particular embodiment to accommodate a particular need, including, but not limited to, the addition of one or more auxiliary/additional/supplemental straps, straps or other attachment means between two or more of the components of the invention.

Note that there may be possible advantages of sloping or cutting away part of the material of one or more components, i.e., to utilize less material, or to decrease the weight of the device. As one of ordinary skill in the art would recognize, some advantage can be gained in using less material, but some minimum of material must be maintained to provide sufficient structural integrity for the device to be useful.

Any number of holster stabilizing strap(s) may be utilized by a user to provide another stabilizing strap connecting the holster to the holster vehicle mount (or, alternatively, zero such additional straps). In some embodiments, the strap(s) may connect the holster to the adjustable tension strap. In other embodiments, the strap may connect the holster to the holster mounting plate.

Note that although the buckle, or other means utilized to connect two or more straps (if a single strap is not employed), may be illustrated as being at an end of a strap, it may be at the end, or any other point along one or both of the straps.

Various components of the various exemplary embodiments may be connected to each other by various methods/means including, but not limited to, sewing, gluing, bonding, welding, snaps, buttons, zippers, buckles, and hooks & loops (i.e., Velcro®). Holsters may similarly be attached by these, and other, means including, but not limited to, slots for receiving a holster belt clip, or slots for receiving a mating portion from a holster/holster clip.

In some embodiments, the holster attachment point to the holster vehicle mount may be variable/adjustable. For example, in the embodiment illustrated in FIGS. 8A-8H, the holster may be attached to the holster vehicle mount by way of a strap which may be attached to various members by hook and loop fasteners. In such an embodiment, the strap may be slid through a belt loop or clip of the holster and then fastened to various components of the holster vehicle mount. In this embodiment, there may be a wide variety/length of Velcro® for the strap to attach to such that a user can adjust the location of the holster relative to the holster vehicle mount to suit the user's installation or other needs. Such variability may be vertical and/or horizontal and/or angular in nature. Thus, if a user wants to adjust the angle of the holster, such as may be desired to adjust the draw angle of a weapon held by the holster, he may simply adjust the holster with respect to the holster vehicle mount such as may be accomplished by removing, adjusting and reattaching the various Velcro members. Note that, as discussed above and elsewhere with respects to various embodiments, other attachment means are suited for attaching the various members of the invention to each other as well as for attaching the holster to the holster vehicle mount. Such adjustment also allows for variously sized and dimensioned holsters, firearms, draw angles, access to holster features (i.e., if there is a safety mechanism that must be deployed/deactivated prior to being able to draw the firearm, a user may want to take care when attaching the holster to preserve access to such feature such that the safety mechanism is easy to manipulate and unobstructed by the holster vehicle mount), etc.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A holster vehicle mount for placement in the interior of a vehicle within reach of a driver of the vehicle, said mount comprising:
    an adjustable tension strap having a first surface, second surface, thickness T, first end and distal end and a central axis A,
    a first attachment means attached at said first end of said adjustable tension strap and co-axial to central axis A, said first attachment means capable of being received in a gap in a vehicle interior positioned below and adjacent a steering wheel column of said vehicle, a second attachment means attached to said distal end of said adjustable tension strap and co-axial to central axis A, said second attachment means capable of being received in a lower gap between dash plates in the vehicle interior positioned below said first attachment means, a holster capable of securely holding a handgun, and means of attaching said holster to said adjustable tension strap wherein said holster is attached intermediate said first end and said second end, wherein a length between said first end of said adjustable tension strap and said distal end of said adjustable tension strap may be adjusted as measured along central axis A and wherein at least one of said first attachment means and said second attachment means is generally hook shaped and sized to fit into a gap between a vehicles' steering wheel column and dash plate or between dash plates of said vehicle and wherein when said first and second attachment means are affixed, a tension is placed upon said adjustable tension strap and said tension is co-axial with central axis A and said tension between said first attachment means and said second attachment means maintains said vehicle holster mount in place without need for additional contact points between the vehicle holster mount and the vehicle, and wherein said holster vehicle mount may be mounted and dismounted without damaging the interior of the vehicle and wherein said vehicle holster mount can be mounted within arms reach of the driver of the vehicle.

2. The holster vehicle mount of claim 1, wherein said adjustable tension strap is comprised of a first member and a second member wherein said first member is connected to said second member by a single piece rigid buckle such that and said first attachment means is attached to said first member and said second attachment means is attached to said second member and the length of said adjustable tension strap is adjusted by movement of one of said first or said second member with respect to said buckle and wherein the other of said first or said second member is maintained in a permanent relationship to said buckle.

3. The holster vehicle mount of claim 1, wherein said adjustable tension strap has a main strap which is connected to said first attachment means and a second strap which is connected to said second attachment means, and said main strap is connected to said second strap, wherein a length between said first attachment means and said second attachment means is adjustable and the length of said adjustable tension strap is adjusted by movement of one of said first or said second member with respect to said buckle and wherein the other of said first or said second member is maintained in a permanent relationship to said buckle.

4. The holster vehicle mount of claim 1, further comprising one or more auxiliary holster straps to allow a holster to be removably attached to said adjustable tension strap wherein said one or more auxiliary holster straps are simultaneously engaged with both said holster and said adjustable tension strap.

5. The holster vehicle mount of claim 1, further comprising a steering column strap shaped and sized to fit around a steering column of a vehicle.

6. The holster vehicle mount of claim 1, further comprising a handgun which fits securely into said holster.

7. The holster vehicle mount of claim 1, wherein said holster is permanently attached to said adjustable tension strap.

8. The holster vehicle mount of claim 1, wherein said adjustable tension strap is comprised of a first strap and a second strap and said first strap and said second strap are connected by an adjustment means and each of said first strap and said second strap has a first end and a distal end, and wherein said first end of said adjustable tension strap is at said first end said first strap and said distal end of said adjustable tension strap is at said distal end of said second strap and said first end of said adjustable tension strap and said distal end of said adjustable tension strap do not connect.

9. The holster of claim 8, wherein said adjustment means is a buckle.

10. A holster vehicle mount for placement in the interior of a vehicle within reach of a driver of the vehicle, said mount comprising:

an adjustable tension strap having a first surface, second surface, thickness T, first end and distal end and a central axis A, a first attachment means attached at said first end of said adjustable tension strap and co-axial with said central axis A, said first attachment means capable of being received in a gap in a vehicle interior positioned below and adjacent a steering wheel column of said vehicle, a second attachment means attached to said distal end of said adjustable tension strap and co-axial with said central axis A, said second attachment means capable of being received in a lower gap between dash plates in the vehicle interior positioned below said first attachment means, a stiffener permanently attached and incorporated into said adjustable tension strap to make at least a portion of said adjustable tension strap rigid, a holster capable of securely holding a handgun, and means of attaching said holster to said adjustable tension strap at the portion of said adjustable tension strap of said stiffener, wherein a length between said first end of said adjustable tension strap and said distal end of said adjustable tension strap may be adjusted and wherein at least one of said first attachment means and said second attachment means is generally hook shaped and sized to fit into a gap between a vehicles' steering wheel column and dash plate or between dash plates of said vehicle, and wherein said holster vehicle mount may be mounted and dismounted without damaging the interior of the vehicle and wherein said vehicle holster mount can be mounted within arms reach of the driver of the vehicle.

11. The holster vehicle mount of claim 10, wherein said adjustable tension strap is comprised of a first member and a second member wherein said first member is connected to said second member by a buckle such that and said first attachment means is attached to said first member and said second attachment means is attached to said second member.

12. The holster vehicle mount of claim 10, wherein at least one of said first attachment means and said second attachment means is generally hook shaped and sized to fit into a gap between a vehicles' steering wheel column and dash plate or between dash plates of said vehicle.

13. The holster vehicle mount of claim 10, wherein said adjustable tension strap has a main strap which is connected to said first attachment means and a second strap which is connected to said second attachment means, and said main strap is connected to said second strap, wherein a length between said first attachment means and said second attachment means is adjustable.

14. The holster vehicle mount of claim 10, further comprising one or more auxiliary holster straps to allow a holster to be removably attached to said adjustable tension strap.

15. The holster vehicle mount of claim 10, further comprising a steering column strap shaped and sized to fit around a steering column of a vehicle.

16. The holster vehicle mount of claim 10, further comprising a handgun which fits securely into said holster.

17. The holster vehicle mount of claim 10, wherein said holster is permanently attached to said adjustable tension strap.

18. A holster vehicle mount for placement in the interior of a vehicle within reach of a driver of the vehicle, said mount comprising:
- an adjustable tension strap having a first strap and a second strap each having a respective first surface, second surface, thickness T, first end and distal end and wherein said first strap is attached to said second strap by a buckle and said first strap has a central axis A and wherein said first strap and said second strap are co-axial,
- a first attachment means attached at said first end of said adjustable tension strap, said first attachment means capable of being received in a gap in a vehicle interior positioned below and adjacent a steering wheel column of said vehicle,
- a second attachment means attached to said distal end of said adjustable tension strap, said second attachment means capable of being received in a lower gap between dash plates in the vehicle interior positioned below said first attachment means,
- a stiffener permanently attached and incorporated into said adjustable tension strap to make at least a portion of said adjustable tension strap rigid,
- a holster capable of securely holding a handgun, and
- means of attaching said holster to said adjustable tension strap,
- wherein a length between said first end of said first strap, i.e., located distal said buckle, and said distal end of said second strap, i.e., located distal said buckle, may be adjusted and wherein at least one of said first attachment means and said second attachment means is generally hook shaped and sized to fit into a gap between a vehicles' steering wheel column and dash plate or between dash plates of said vehicle, and
- wherein said holster vehicle mount may be mounted and dismounted without damaging the interior of the vehicle and wherein said vehicle holster mount can be mounted within arms reach of the driver of the vehicle.

* * * * *